July 6, 1926.

R. BACCELLIERI

DIE FOR MAKING MACARONI, SPAGHETTI, OR NOODLES

Filed May 7, 1925   3 Sheets-Sheet 2

1,591,265

Witnesses:
Walter Chism
George A. Gines

Inventor
Raffaele Baccellieri
by Joshua R. H. Potts
his Attorney

July 6, 1926.

R. BACCELLIERI 1,591,265

DIE FOR MAKING MACARONI, SPAGHETTI, OR NOODLES

Filed May 7, 1925    3 Sheets-Sheet 3

Inventor
Raffaele Baccellieri
by Joshua R. H. Potts
his Attorney.

Witnesses:
Walter Churm
George A. Gruss

Patented July 6, 1926.

1,591,265

UNITED STATES PATENT OFFICE.

RAFFAELE BACCELLIERI, OF PHILADELPHIA, PENNSYLVANIA.

DIE FOR MAKING MACARONI, SPAGHETTI, OR NOODLES.

Application filed May 7, 1925. Serial No. 28,612.

My invention relates to dies for making macaroni, spaghetti or noodles.

The dies now in use have the upper ends of the dough discharge openings countersunk to reduce the thickness of metal in which the openings are formed, and to lessen the resistance to the dough as it passes through the openings.

The objection to these dies is that the counter-sunk upper end of each opening flares outwardly and occupies a large part of the upper face of the die. This limits the number of dough discharging openings that may be used, far below the number that could be used without the counter-sunk part. Dough discharging openings without a counter-sunk part are difficult to make and in some cases impossible because the metal through which the openings must be cut is too thick. This thickness is necessary to give the die the proper strength. The counter-sunk part reduces the thickness of the metal through which the dough discharging openings are cut without sacrificing much strength of the die. The finished dies are of large size and small capacity and require more power to force the dough through the openings than smaller dies having the same number of openings.

The objects of my invention are to provide a die which is light, small, of large capacity and of inexpensive construction, and which requires less power to force the dough through the openings.

These objects, and other advantageous ends which will be described hereinafter, I attain in the following manner, reference being had to the accompanying drawings in which—

Figure 1:
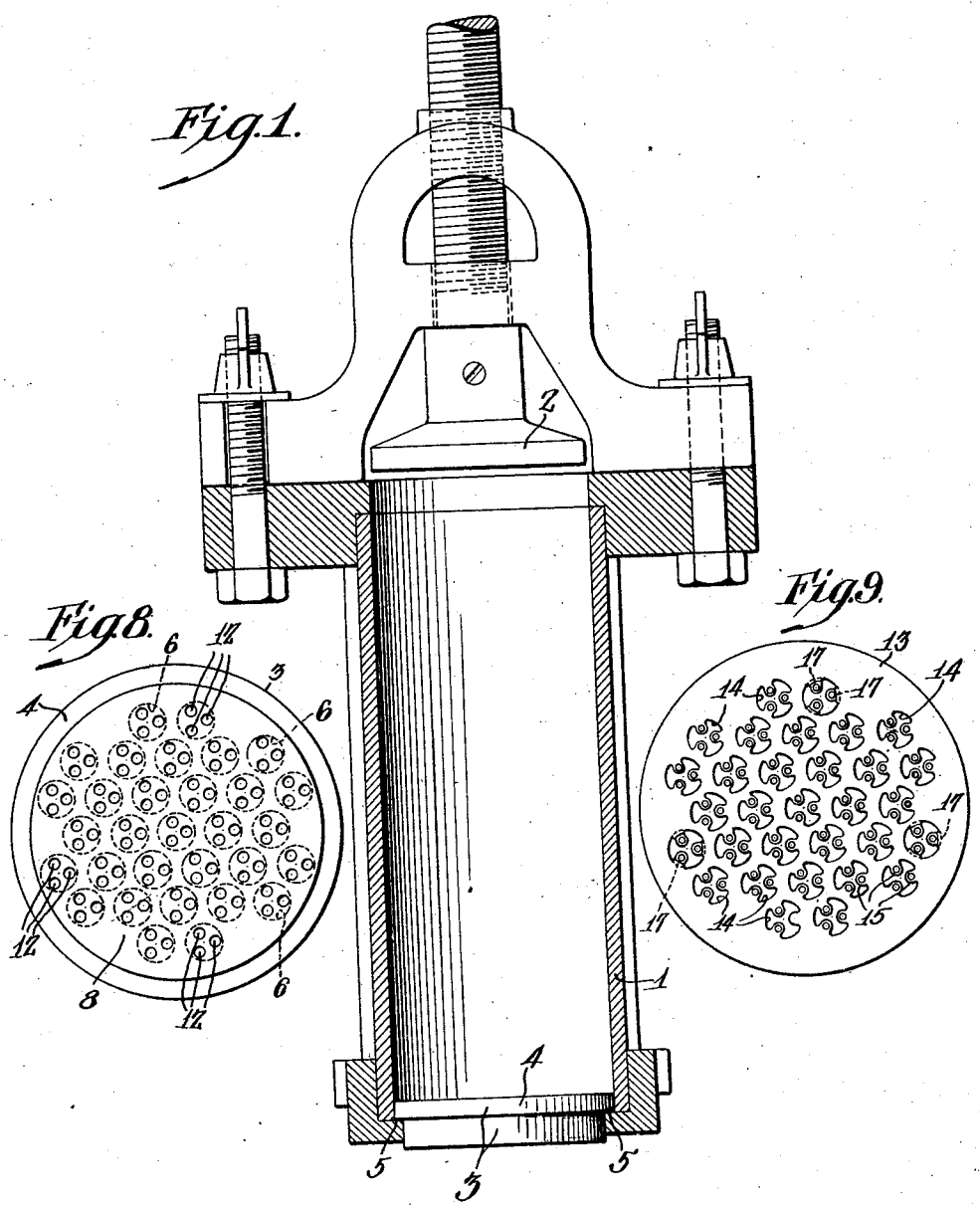
Figure 2:
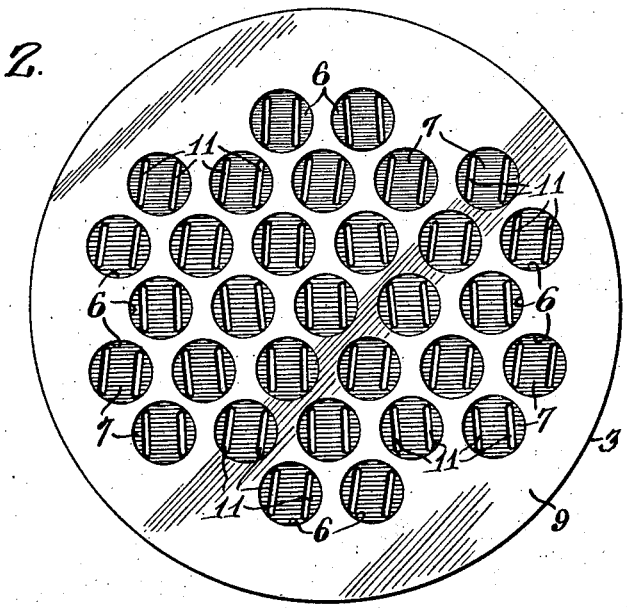
Figure 3:
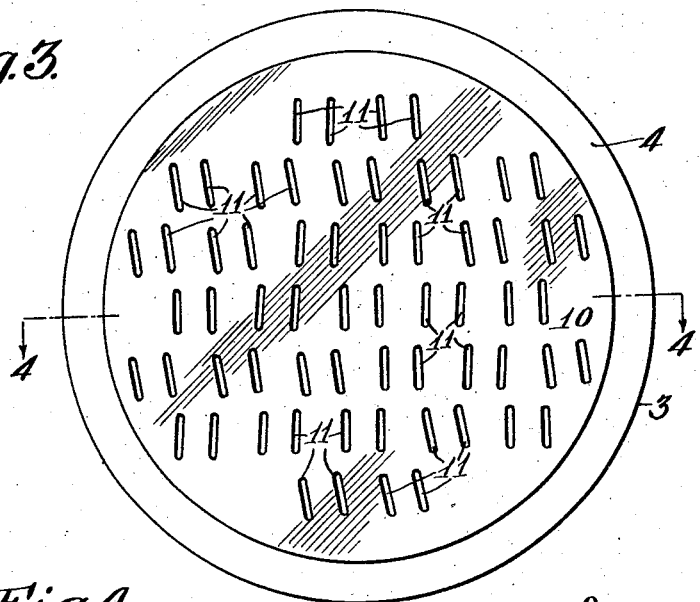
Figure 4:
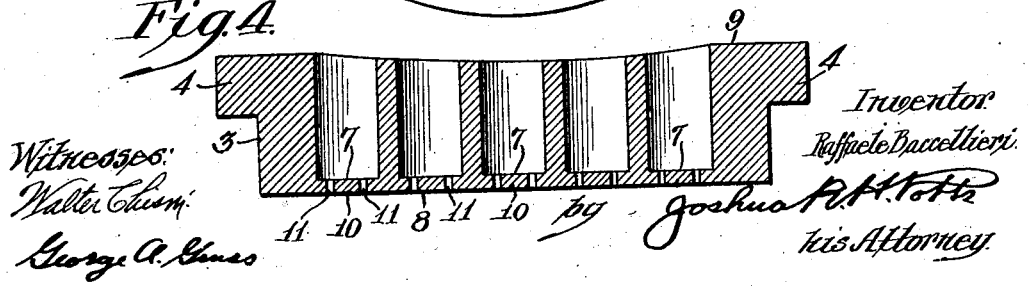
Figure 5:
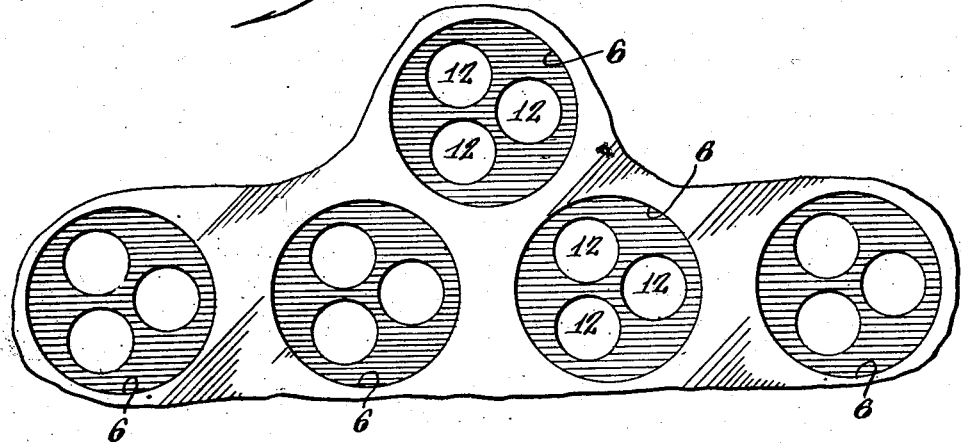
Figure 6:
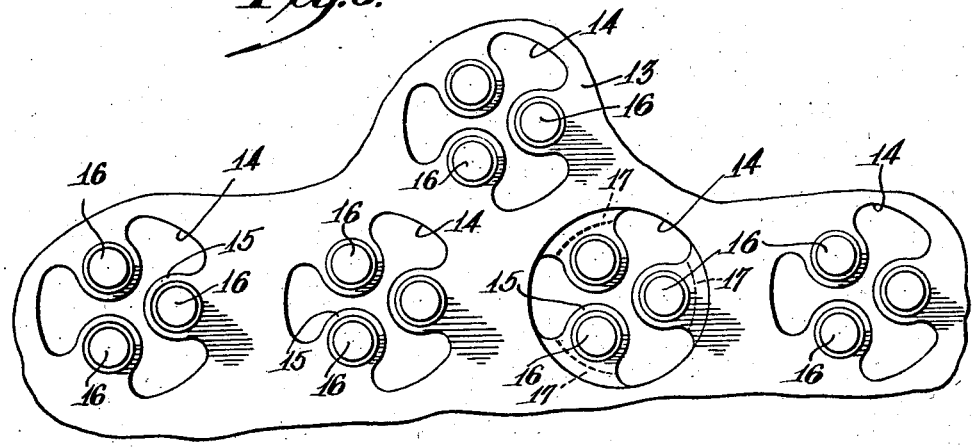
Figure 7:
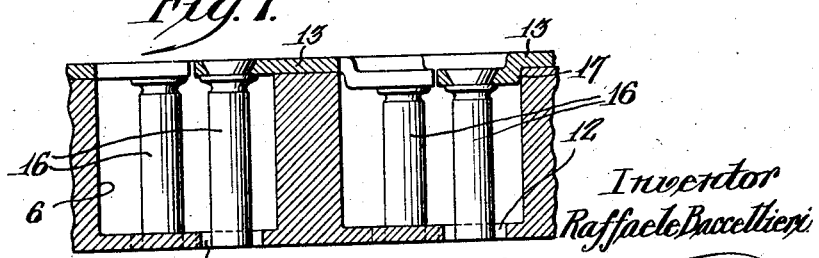

Figure 1 is a central section through a press having my die mounted therein,

Figure 2 an enlarged plan view of the die shown in Figure 1, illustrating it arranged for making noodles, Figure 3 an inverted plan view of the die shown in Figure 2, Figure 4 a section on line 4—4 of Figure 3, Figure 5 an enlarged fragmentary plan view of the die shown in Figure 1, illustrating it arranged for making spaghetti, Figure 6 a fragmentary inverted plan view of a plate adapted to be used with the die shown in Figure 6 for converting it into a die for making macaroni, Figure 7 a fragmentary central section through the die shown in Figure 5 illustrating the plate shown in Figure 6 mounted thereon for making macaroni, Figure 8 an inverted plan view of the whole die partly shown in Figure 5, and Figure 9 a plan view of the whole plate shown in Figure 6.

Referring to the drawings, 1 indicates the cylinder of a press and 2 the piston mounted for movement within the cylinder for forcing dough through a die 3 mounted at the bottom of the cylinder. The die has a flange 4 which rests on a shoulder 5 in the cylinder.

Die 3 has a plurality of pockets 6 which have flat bottoms 7 substantially parallel with the lower face 8 of the die. These pockets extend from the upper face 9 of the die to a point near the lower face 8 so that a thin portion 10 of metal is left under the pocket. Through this thin part in each pocket a plurality of dough shaping openings are punched. In Figures 2 to 4 the openings 11 are shown in slit form for making noodles. In Figures 5 and 8 the openings 12 are shown in circular form for making spaghetti. The dough shaping opening may be angular, corrugated or of other shapes without affecting the efficiency of the die.

To convert the die shown in Figures 5 and 8 into a macaroni making die, a plate 13 is used with the die. This plate has openings 14 adapted to be disposed over pockets 6, and lugs 15 extending toward the center of each opening 14. Pins 16 are secured to the lugs and are adapted to depend into the openings 14 of the die as shown in Figure 7. To prevent the pins from shifting out of proper position, I preferably provide shoulders 17 on certain groups of lugs 15, by offsetting the lugs below the upper surface of the plate. These shoulders hug the walls of certain of the pockets 6 and prevent the plate and pins from shifting out of position.

To make noodles, a die having slits 11 as shown in Figures 2 to 4 is inserted in cylinder 1 of the press so that its flange 40 abuts shoulder 5. After dough is placed in the cylinder, piston 2 is screwed down to force the dough through the die. The dough coming through the openings will be in the shape of ribbons which are cut into noodles.

To make spaghetti, a die having circular openings as shown in Figures 5 and 8 is inserted and used in cylinder 1 in a similar way as a die for making noodles. The dough passes through the openings of the die in solid circular form which is cut in proper lengths into spaghetti.

To use the die for making spaghetti to make macaroni, plate 13 is placed on the upper face of the die so that its openings 14 will be over pockets 6, shoulders 17 hugging the walls of certain of the pockets 6 and pins 16 within openings 12. The die is then placed and used in a press similarly to the die for making noodles. The dough passes through openings 14 in the plate, around the pins 16 and through openings 12 in the die, and comes out in tubular form which is cut in proper lengths.

The die above described has a strong network of material left between the pockets; is of large capacity because the pockets have flat bottoms provided with a plurality of dough shaping openings; is inexpensive to make because the pockets may be easily drilled to a point near the lower face of the die so as to leave a thin portion of material through which the dough shaping openings may be easily punched, and requires less power to force the dough through the openings because of the large number of openings in a small space.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A die having a plurality of pockets in one side extending through a greater part of the thickness of the die, a plurality of openings in the other side of the die communicating with each pocket through its bottom, a plate resting upon the upper face of said die and having openings communicating with said pockets, and pins carried by said plate and extending into the openings in the die, substantially as described.

2. A device as set forth in claim 1 in which the said plate is formed with lugs extending over said pockets to support said pins, substantially as described.

3. A device as set forth in claim 1 in which said plate is provided with lugs extending over said pockets to support said pins, and certain of said lugs being depressed forming shoulders abutting the walls of the pockets to maintain the pins centered within the openings, substantially as described.

In testimony whereof I have signed my name to this specification.

RAFFAELE BACCELLIERI.